US00RE37858E

(19) United States
(12) Reissued Patent
Murakami et al.

(10) Patent Number: US RE37,858 E
(45) Date of Reissued Patent: Sep. 24, 2002

(54) MOTION COMPENSATION PREDICTING ENCODING METHOD AND APPARATUS

(75) Inventors: Tokumichi Murakami; Kohtaro Asai; Yoshiaki Kato; Yoshihisa Yamada, all of Kamakura (JP)

(73) Assignee: Mitsubishi Denki Kabushiki Kaisha, Tokyo (JP)

( * ) Notice: This patent is subject to a terminal disclaimer.

(21) Appl. No.: 09/095,900

(22) Filed: Jun. 11, 1998

Related U.S. Patent Documents

Reissue of:

(64) Patent No.: 5,600,737
Issued: Feb. 4, 1997
Appl. No.: 08/309,261
Filed: Sep. 20, 1994

U.S. Applications:

(63) Continuation of application No. 07/861,953, filed on Apr. 1, 1992, now Pat. No. 5,428,693.

(30) Foreign Application Priority Data

Apr. 12, 1991 (JP) ..... 3-080081
Jul. 26, 1991 (JP) ..... 3-187490
Jul. 26, 1991 (JP) ..... 3-187849

(51) Int. Cl.[7] ..... G06K 9/36; G06K 9/46

(52) U.S. Cl. ..... 382/233; 382/232; 382/236; 382/248; 375/240.16

(58) Field of Search ..... 382/233, 236, 382/238, 239, 248, 250, 251; 348/400, 402, 403, 407, 413, 415, 416; 375/240.01, 240.12, 240.13, 240.16, 240.18, 240.2, 240.24, 240.25

(56) References Cited

U.S. PATENT DOCUMENTS 4,908,862 A 3/1990 Kaneko et al.
4,999,705 A * 3/1991 Puri ..... 348/412
5,091,782 A * 2/1992 Krause et al. ..... 348/400
5,093,720 A 3/1992 Krause et al.
5,168,357 A * 12/1992 Kutka ..... 348/403
5,227,878 A * 7/1993 Puri et al. ..... 348/416
5,305,115 A 4/1994 Takahashi et al.
5,428,693 A 6/1995 Murakami et al.

FOREIGN PATENT DOCUMENTS

| | | |
|---|---|---|
| EP | 0467040 | 1/1991 |
| EP | 412713 | 2/1991 |
| EP | 0451545 | 10/1991 |
| EP | 467718 | 1/1992 |
| EP | 0510972 | 6/1992 |
| WO | WO87-02854 | 5/1987 |
| WO | 363677 A2 | 9/1989 |
| WO | 412713 A2 | 7/1990 |

OTHER PUBLICATIONS

Proceedings of the National Communications Forum, "Video Compression and Image Processing", Sep. 1988, Le Gall et al., pp. 1678–1682.

Third International Workshop on HDTV Proceeding vol. III (1989.8) S. Nogami et al., "A study on HDTV Signal Coding with Motion Adaptive Noise Reduction".

* cited by examiner

*Primary Examiner*—Phuoc Tran

(57) ABSTRACT

A motion compensation predicting coding apparatus includes a motion detector for comparing pixel data in an image signal with pixel data of the previous image signal to generate a motion vector. The motion vector is indicative of the displacement differences between the image signal and the previous image signal. The image signal may be organized into blocks of pixel data for a single field or for multiple fields when notion detection is performed on the image signal by the motion detector. A subtracter generates a prediction compensation error signal by subtracting the pixel data in the previous image signal from the pixel data of the image signal. A coder receives the prediction compensation error signal and generates an appropriate coded output. The apparatus may also include an adaptive blocking mechanism for receiving the prediction compensation error signal and organizing the data in the signal into blocks into one of several fashions as dictated by the motion vector.

9 Claims, 15 Drawing Sheets

MOTION COMPENSATION PREDICTING ENCODING METHOD AND APPARATUS

Matter enclosed in heavy brackets [ ] appears in the original patent but forms no part of this reissue specification; matter printed in italics indicates the additions made by reissue.

This application is a continuation of application Ser. No. 07/861,953 filed Apr. 1, 1992, now U.S. Pat. No. 5,428,693.

BACKGROUND OF THE INVENTION i) Field of the Invention

The present invention relates generally to image encoding systems and, more particularly, to motion compensation predicting coding systems.

ii) Description of the Prior Art

FIG. 1 shows a conventional motion compensation predicting coding apparatus, as disclosed in "A Study on HDTV Signal Coding with Motion Adaptive Noise Reduction" by S. Nogaki, M. Ohta and T. Omachi, The Third HDTV International Workshop Preliminary Report, Vol. 3, 1989. The conventional motion compensation predicting coding apparatus encodes a digital image signal 101 to produce a coded signal 106 that is sent over a transmission line 109. The conventional motion compensation predicting coding apparatus includes a frame memory 1, a motion detector 2, a subtracter 3, a coder 4, a local decoder 5, an adder 6 and a multiplexer (MUX) 7. At a destination, the coded data is decoded to reproduce the original image signal 101. The destination has an architecture similar to that shown in FIG. 1, except that the destination in configured to decode rather than encode.

Before discussing the operation of the conventional coding apparatus, it is helpful to review the format of the image data to be encoded. An image may be viewed as being made of a number of picture elements for pixels. Each of these pixels has a certain level of luminance that is encoded according to a grey scale or other scale. The luminance for each pixel may be encoded into a digital signal. The digital signals for an entire screen of the display form a frame. This frame may be broken down into rows of pixels. Since many video displays, such as conventional cathode ray tubes, scan odd numbered rows in a first pass and even numbered rows in a second pass when generating an image (i.e., interlaced scanning), it is helpful to view the frame as being composed of an even field having data for even numbered rows and an odd field having data for odd numbered rows. Each of the fields (i.e., the odd field and the even field) may be further divided into blocks of pixel data such as regions of 8 pixels by 8 pixels.

The conventional motion compensation predicting coding apparatus operates as follows. An input image signal 101 or, for example, a digital signal encoding the luminances of pixels in a frame is provided in accordance with an interlaced scanning format. In the interlaced scanning format, the odd rows of pixels are first scanned and then the even rows of pixels are scanned. Hence, the input signal provides a sequence of pixel data beginning with the data for all of the odd rows which is followed by the data for all of the even rows. For purposes of the present discussion, it is assumed that the input image signal 101 is already organized into blocks. Each block is made of pixels of the same field. The system operates on a block at a time until all the blocks of a given field are encoded. The system then proceeds to encode the blocks of the other field in a frame. Once a frame is fully encoded, the process of encoding is repeated with a next frame.

The input image signal 101 of the present frame is compared with the image signals for the same field in a preceding frame to carry out motion detection. For instance, suppose a first block in the input image signal 101 encodes luminance information for a block of pixels in the odd field of a present frame. The motion detection of this first block is performed in the motion detector 2 by searching for the most analogous block in the neighboring blocks 102 in the previous frame that are positioned around the corresponding position of the first block. The neighboring blocks 102 are read out of the frame memory 1 and provided to the motion detector 2. The frame memory 1, stores image data (of local decoded signals 108) which has been locally decoded in the local decoder 5 and which has been summed with a motion compensation signal 104 in the adder 6. The frame memory 1 may be realized as a conventional RAM.

The motion detector 2 determines the similarities between the present block and the respective neighboring blocks to select the most analogous neighboring blocks. As a yardstick of similarity, the motion detector 2 may calculate a different absolute value sum between blocks that is obtained by summing absolute values of each difference in luminance values for the corresponding pixels in the blocks, or the motion detector may calculate a differential square sum that is obtained by summing square values of differences in luminance values between the corresponding pixels in the blocks.

Once the most analogous neighboring block is found, the motion detector 2 calculates and outputs a motion vector 103 to the frame memory 1 and the MUX 7. The motion vector indicates the vector displacement difference between the most analogous neighboring block and the first block. This motion vector 103 includes vector components in the horizontal and vertical directions. Also, once the most analogous neighboring block is found, a motion compensation prediction signal 104 that encodes the illuminance of the pixels of the most analogous neighboring block is read out of the frame memory 1 and sent to a subtracter 3.

The subtracter 3 subtracts the motion compensation prediction signal 104 from the input image signal 101 to obtain a prediction error signal 105. In particular, the illuminance of each pixel in the motion compensation prediction signal is subtracted from the illuminance of each corresponding pixel in the input image signal 101. Chips for performing the subtraction are commercially available. The subtracter 3 then outputs the prediction error signal 105 to the coder 4. The coder 4 executes the coding of the prediction error signal 105 to remove spatial redundancy in the signal. The coder 4, thus, helps to compress the prediction error signal 105. The signal 105 includes both low frequency components and high frequency components. Usually, in compressing the prediction error signal 105, the coder 4 quantizes the low frequency components of the signal 105 using many bits and quantizes the high frequency components using few bits. More bits are used in the encoding of the low frequency components because the low frequency components typically have much grater power than do the high frequency components. Assigning more bits to the low frequency components enhances coding efficiency and reduces image degradation. The coder 4, may perform, for example, an orthogonal transformation, such as a discrete cosine transformation (DCT), on an 8×8 pixel block to effect a frequency conversion that results in scalar quantization of a conversion factor. Scalar-quantized coded data 106 for the block is then sent from the coder 4 to the local decoder 5 and to the MUX 7.

The MUX 7 not only multiplexes the coded data 106 and the motion vector 103 but also encodes the data in a format proper for sending the data down the transmission line 109. The local decoder 5 performs a reciprocal operation to that performed by the coder 4. In particular, an inverse scalar quantization or an inverse orthogonal transformation is carried out to obtain a decoded error signal 107. The adder 6 adds the motion compensation predicting signal 104 to the decoded error signal 107 to obtain the local decoded signal 108, which corresponds to the input image signal 101. Chips for implementing the adder 6 are well known in the art. The local decoded signal 108 is stored in the frame memory 1. The local decoded signal is subsequently read out of the frame memory 1 for use in carrying out the motion detection of the odd field in the next frame.

For the even field of the input image signal 101, the motion detection in the motion detector 2, the coding in the coder 4, and so forth are carried out in the same manner as described above with respect to the odd field.

In the conventional motion compensation predicting coding apparatus, as described above, the removal of the temporal redundancy included in the motion image signal is carried out by motion compensation predicting coding and by using an appropriate technique such as an orthogonal transformation, differential pulse code modulation (DPCM), vector quantization or the like. As described above, in the conventional motion compensation predicting coding apparatus, the correlation of the data in the same field is utilized. However, the temporal correlation between continuous different fields subjected to the interlaced scanning is not used, and, hence, the coding efficiency is low.

It is, therefore, a general object of the present invention to provide a more efficient motion compensating predicting coding method and apparatus.

SUMMARY OF THE INVENTION

The foregoing objects and other objects and advantages will be realized by the present invention in which a motion compensation predicting coding apparatus encodes pixel data of an image signal. The image signal includes pixel data organized into a even field and odd field for a portion of an image. The apparatus includes a motion detector for comparing the pixel data in the image signal with pixel data of a previous image signal. The motion detector generates a motion vector that is indicative of the displacement differences between the image signal and the previous image signal.

The motion compensation predicting coding apparatus also includes a subtracter for generating a prediction compensation error signal by subtracting the pixel data in the previous image signal from the pixel data of the current image signal. The resulting prediction compensation error signal is passed through an adaptive blocking mechanism that organizes the data of the prediction compensation error signal into blocks in one of several fashions. The blocking strategy is chosen as dictated by the motion vector. The blocking mechanism generates a blocked output that is fed to a coder and encoded.

The motion compensation predicting coding apparatus may alternatively include a field composer for composing the odd field pixel data in the incoming image signal with even field pixel data in the incoming image signal to produce as composed image signal. This composed image signal has pixel data for both the even and odd fields. This composed image signal is used by the motion detector in determining the motion vectors. Thus, in this alternative embodiment, the motion detection is not carried out strictly on single field blocks but rather is carried out on field composed blocks.

The coder for encoding output may include several components. First, the code may include a transformation means for performing an orthogonal transformation on the prediction error signal to produce a coefficient matrix. Second, the coder may include a quantizer for quantizing the coefficients from the coefficient matrix and a scanning controller for controlling what order the coefficients are scanned from the coefficient matrix and passed to the quantizer. This order is preferably controlled by the motion vectors. In particular, the motion vectors indicate whether there will be large horizontal components or large vertical components that are most efficiently quantized by altering the scanning order of the coefficient matrix. These elements may be used in conjunction with the above-described components.

BRIEF DESCRIPTION OF THE DRAWINGS

The above and other objects, features and advantages of the present invention will be more fully apparent from the following description of the preferred embodiments with reference to the accompanying drawings, in which.

DESCRIPTION OF THE PREFERRED EMBODIMENTS

Figure 1:
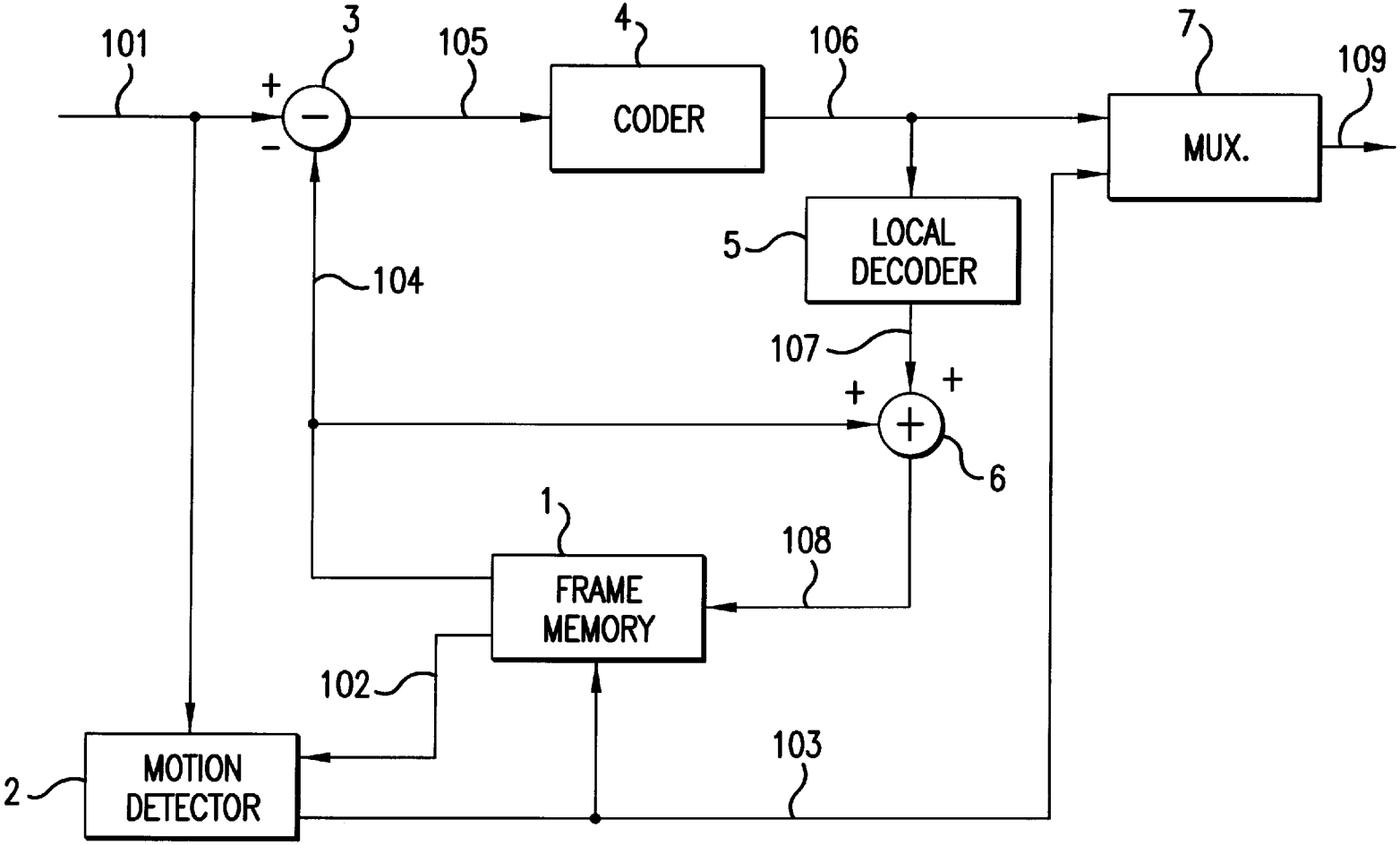
FIG.1 PRIOR ART
FIG. 1 is a block diagram of a conventional motion compression predicting coding apparatus.

The present invention will now be described in connection with its preferred embodiments with reference to the attached drawings, wherein like reference characters designate like or corresponding parts throughout different views.

Figure 2:
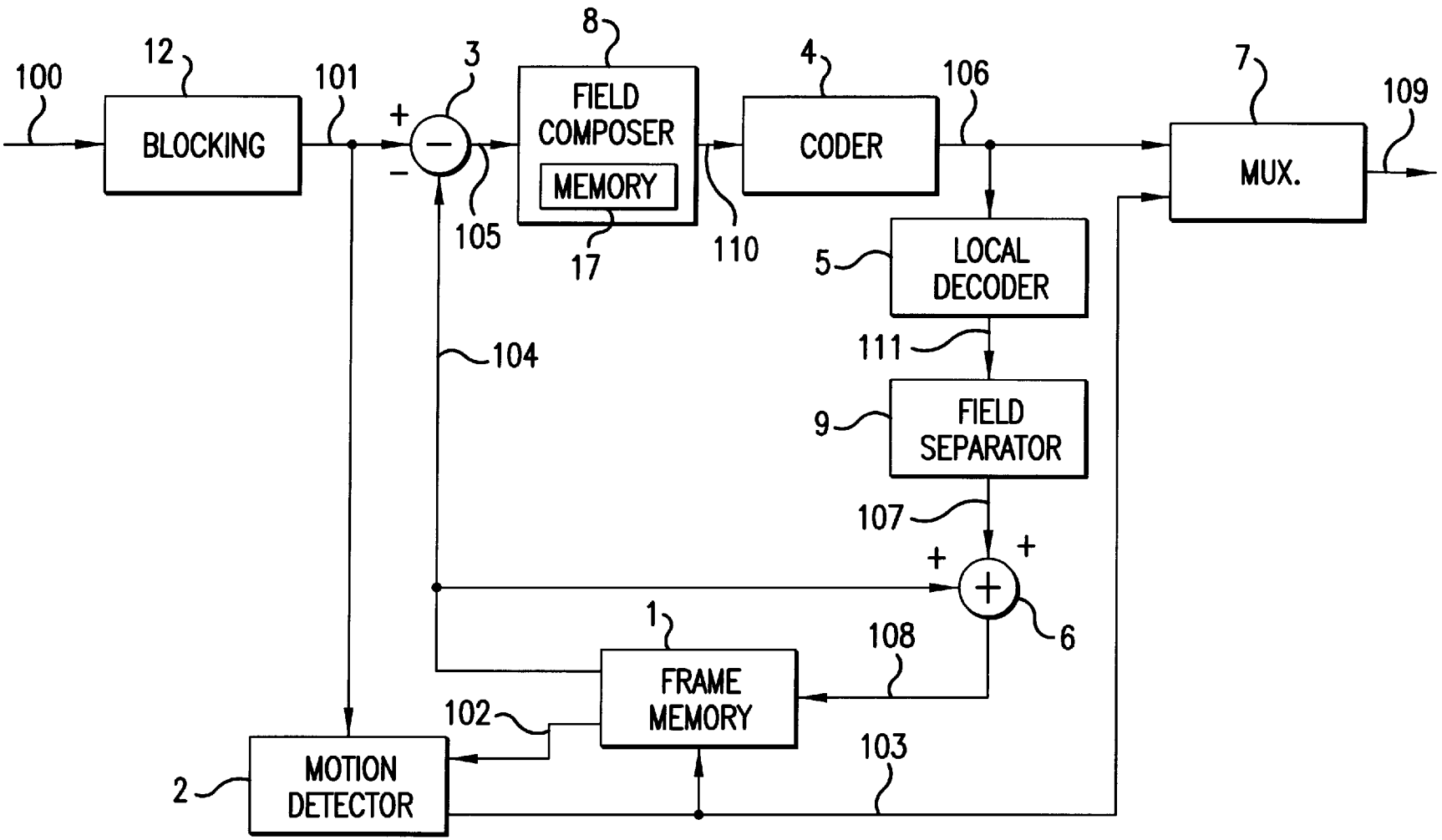
FIG. 2 is a block diagram of a first embodiment of a motion compensation predicting decoding apparatus according to the present invention.

FIG. 2 shows a first preferred embodiment of a motion compensation predicting coding apparatus, in accordance with the present invention. The motion compensation predicting coding apparatus of FIG. 2 includes a frame memory 1, a subtracter 3, a coder 4, a local decoder 5, an adder 6 and a multiplexer (MUX) 7, which each are of the same construction and have the same functionality as corresponding components of the conventional motion compensation predicting coding apparatus shown in FIG. 1. The coder 4 will be described in more detail below. This embodiment of the invention further includes a field composer 8 for composing blocks of the input signal into fields for coding, a field separator 9 for decomposing coded signals, and a blocking controller 12 for blocking input image signals 100 into blocks.

The motion compensation predicting coding apparatus shown in FIG. 2 operates as follows. An input image signal 100 is input to blocking controller 12. This input image signal is not yet organized into blocks. The input image signal 101 includes both even and odd fields of pixel luminance data, for an area of an image sent in an interlaced scanning format. In most instances a block may be made of 8×8 pixels or 16×16 pixels. The blocking controller 12 organizes the data encoded in the signals into blocks to produce a blocked input image signal 101 having blocks of pixel data. Each block in the blocked input image signal 101 includes either exclusively even field pixel data or exclusively odd field pixel data.

A block of the blocked input image signal 101 is sent to the motion detector 2 and to the subtracter 3. The motion detector 2 performs an evaluation of the similarity of the present block of the blocked input image signal 101 to the neighboring blocks 102 of the same field in the preceding frame, which are read out of the frame memory 1. This evaluation is carried out in the same manner as it is carried out in the conventional apparatus described with reference to FIG. 1. The motion between the present block and the most similar block of the preceding frame is captured in the motion vectors 103 that are output to the frame memory 1 and the MUX 7. The motion vectors include a horizontal component vector and a vertical component vector.

The frame memory 1 reads out a motion compensation prediction signal 104 for the neighboring blocks that are used in the comparison to generate the motion vectors 103. The motion compensation prediction signal 104 encodes luminance pixel data for the neighboring blocks of a previous frame. The subtracter 3 subtracts the motion compensation prediction signal 104 from the present pixel data to obtain a prediction error signal 105. In particular, the subtracter 3 subtracts the pixel data for the even field of the input image signal 101 from the even field of a neighboring block which has the most similar even field, when an even blocked image signal 101 is input and subtracts the pixel data for the odd field of the input image signal 101 from the odd field of a neighboring block which has the most similar odd field when an odd blocked image signal 101 is input. The subtraction is performed on a pixel by pixel basis. The prediction error signal is separately obtained for both the odd field and the even field of each area of an image.

Figure 4C:
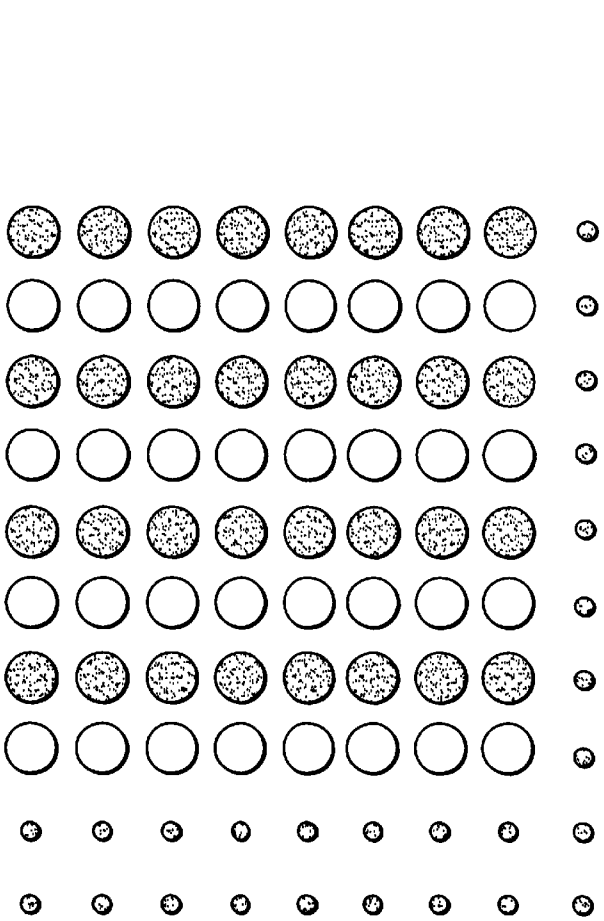
FIG. 4C shows a field composition frame input signal formed from the blocks of FIG. 4A and FIG. 4 using a field composition method
Figure 4A:
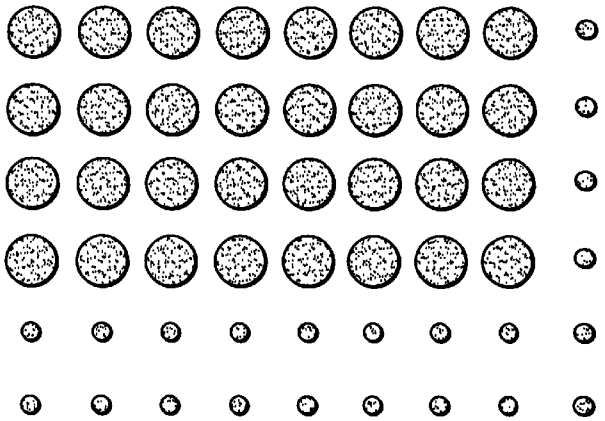
FIG. 4A shows a block of an odd field.
Figure 4B:
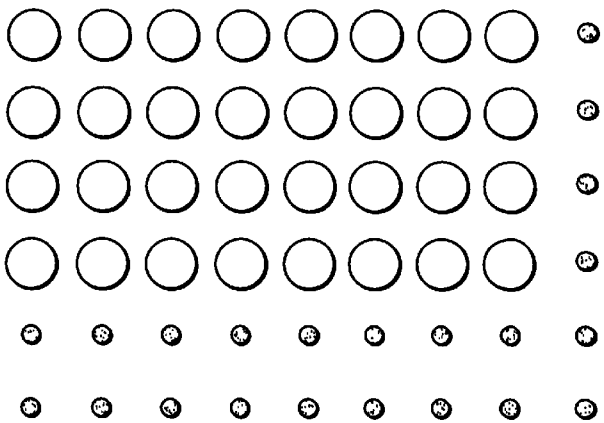
FIG. 4B shows a block of an even field

The resulting prediction error signal 105, having results from the subtracter 3 for the odd field and even field of an area, is composed into one frame in the field composer 8. FIGS. 4A–4C illustrate the block composing method performed by the field composer 8. FIG. 4A shows blocked data of an odd field for an area of an image, and FIG. 4B shows blocked data of an even field in the same area as the odd field of FIG. 4A. The lines of these two fields are alternately combined by the field composer 8 to obtain a field composition frame input signal as shown in FIG. 4C. In order to carry out such a frame composing process, the field composer 8 (FIG. 2) includes a memory 17, such as a RAM, for storing more than one field of data.

The field composer 8 produces the composed output, known as a field composition prediction error signal 110, that is sent to the coder 4. The coder 4 produces coded data 106 and sends the coded data to both the local decoder 5 and the MUX 7.

In the MUX 7, the coded data 106 are multiplexed with the motion vectors 103 of the odd and even fields, and the multiplexed data are placed in a format proper for the transmission line 109. In the local decoder 5, the coded data 106 are locally decoded to obtain a field composition decoded prediction error signal 111 which is sent to the field separator 9. In the field separator 9, the lines of the field composition decoded prediction error signal 111 are alternately separated to obtain separate respective decoded prediction error signals 107a for the odd field and the even field. In the adder 6, each decoded prediction error signal 107a is added to the motion compensation predicting signal 104 of the corresponding field to obtain a local decoded signal 108, which is sent to the frame memory and is stored therein.

In the coder 4, two-dimensional predicting coding is performed using the correlation between the neighboring pixels in the horizontal and vertical directions of the motion compensation prediction error signal 110. One approach to coding that may be employed is an approach which uses the discrete cosine transform (DCT). The DCT approach is well-known to those skilled in the art. The DCT approach, as described in the Background of the Invention, transforms a block of input of a given size to produce an equal sized array of transform coefficients. Each composed block that is input to the coder 4 undergoes a two-dimensional transformation that yields the transform coefficients. The DCT approach converts the input components into frequency components.

Figure 5:
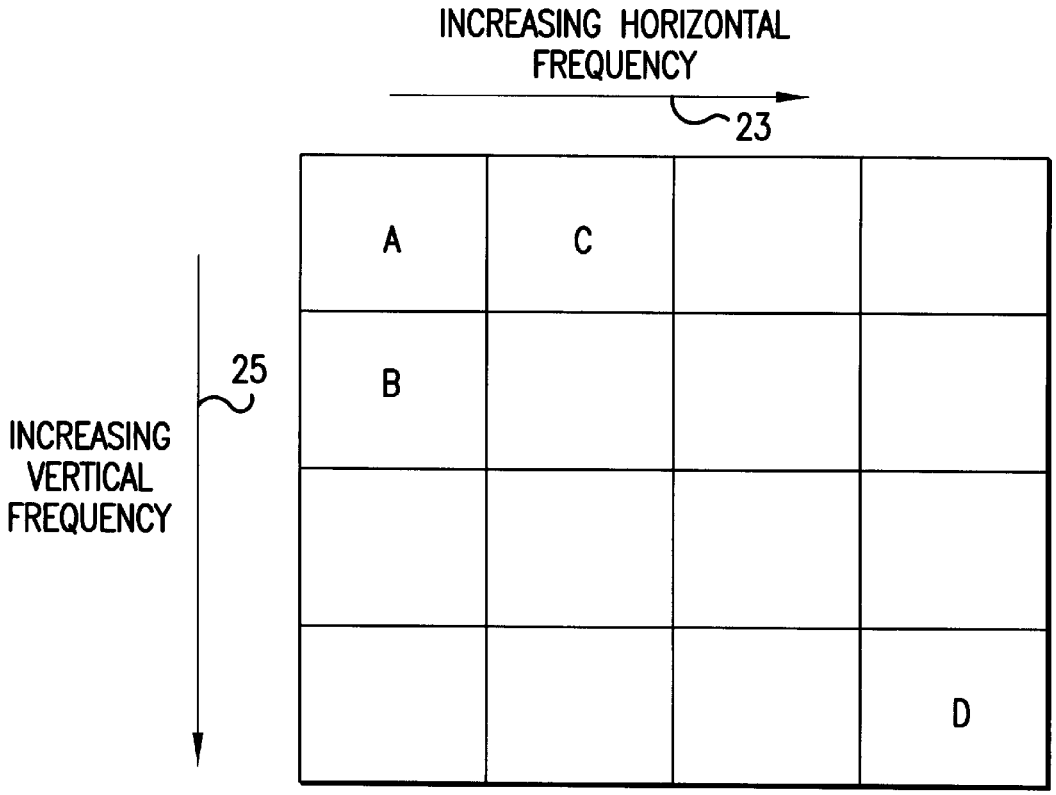
FIG. 5 shows a coefficient matrix for a DCT coding method.

The low frequency coefficients are quantized more finely (i.e., assigned a larger number of bits) because they typically possess greater energy. Hence, less distortion arises given the higher precision of the encoding of these lower frequencies. In contrast, the higher frequency coefficients are quantized more coarsely (i.e., assigned fewer bits) and possess less energy. FIG. 5 provides an illustration of a 4×4 coefficient matrix that is the product of a DCT approach. The frequency of the coefficients is the lowest in the upper left-hand corner of the matrix. Hence, the coefficient designated as "A" has the lowest frequency. The horizontal frequency of the coefficients increases as one moves horizontally across the rows of the matrix in the direction of arrow 23 in FIG. 5. Likewise, the vertical frequency of the coefficients increases as one moves down a column of the matrix in the direction of arrow 25. Accordingly, coefficient "C" has a greater horizontal frequency than coefficient "A", but has a similar vertical frequency. On the other hand, coefficient "B" has a greater vertical frequency than coefficient "A" but has a similar horizontal frequency.

As was mentioned above, the lower frequency components are assigned more bits than the higher frequency components. Thus, coefficient "A" typically has the greatest number of bits assigned to it. The cumulative frequency in the coefficient matrix then increases in a zig-zag fashion.

Specifically, coefficients "B" and coefficients "C" are the next [highest] *lowest* frequency components and typically are assigned the next highest number of bits relative to coefficient "A". The number of bits assigned to the coefficients continues to decrease until the highest frequency component "D" is reach. Typically, coefficient "D" is assigned zero bits.

In the above discussion, the coder 4 (FIG. 2) is described as performing the coding by DCT, which is kind of orthogonal transformation. It is, however, also possible to perform the coding by utilizing other well-known techniques such as differential pulse code modulation (DPCM) or vector quantization. When vector quantization is used, a codebook is used.

Figure 6A:
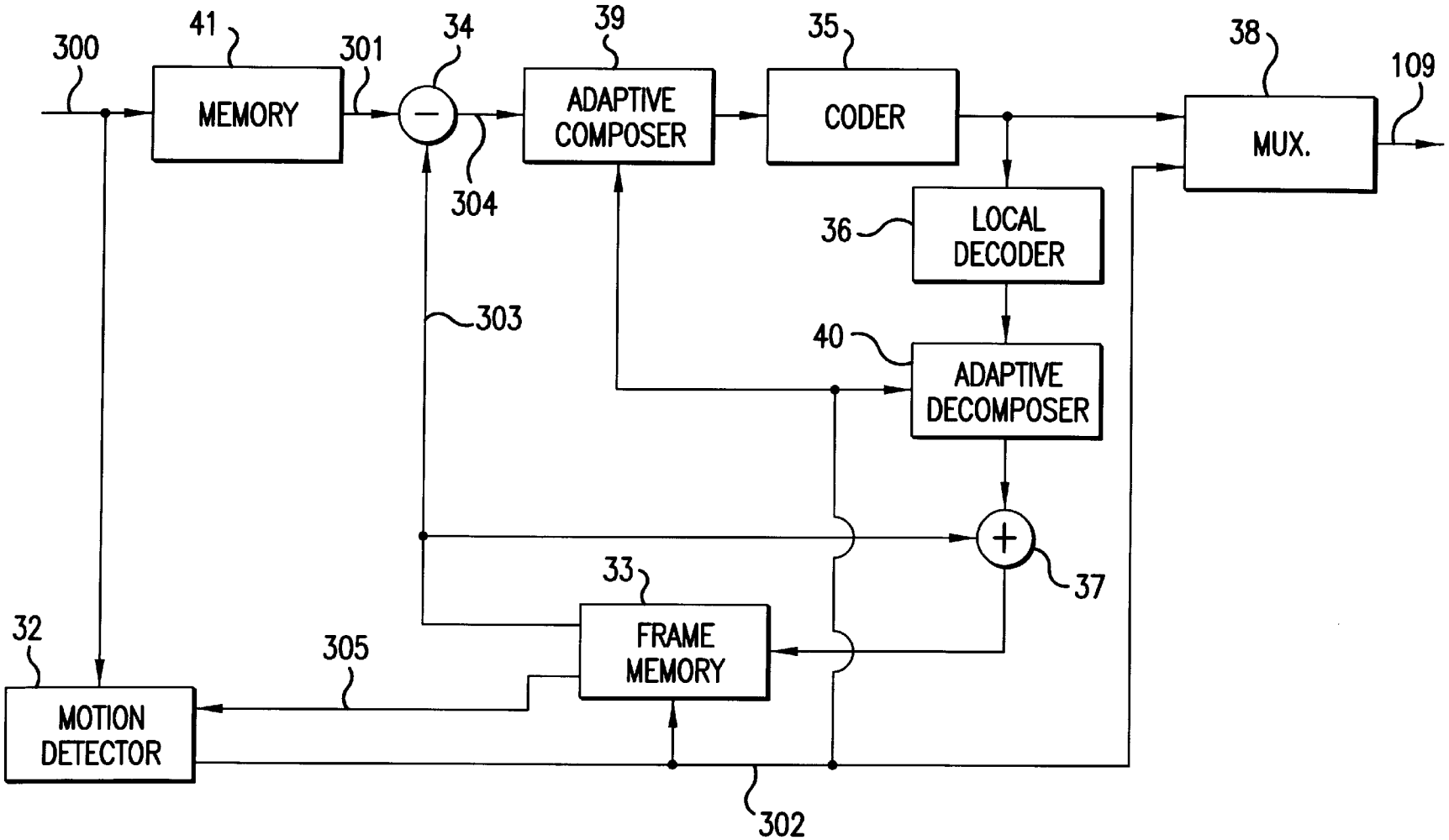
FIG. 6A is a block diagram of a second embodiment of a motion compensation predicting coding apparatus according to the present invention.

FIG. 6A shows a second embodiment of a motion compensation predicting coding apparatus. This second embodiment includes a motion detector 32, a frame memory 33, a subtracter 34, a coder 35, a local decoder 36, an adder 37 and a multiplexer 38, like the corresponding components in the first described embodiment of FIG. 2. This second embodiment, however, differs from the first embodiment in that it includes an adaptive composer 39, an adaptive decomposer 40 and a memory 41. The operations and functions of these additional components will be described below.

In this second embodiment, an input image signal 300 is input to the motion detector 32 and the memory 41. This input image signal 300 is already organized into blocks. In the motion detector 32, a determination is made in the adaptive composer 39 using the motion vector 302 whether the coding is carried out in a field composition mode or in a field independent mode. For example, when the motion vectors of both the fields are coincident with each other, both the fields are composed.

Figure 6B:
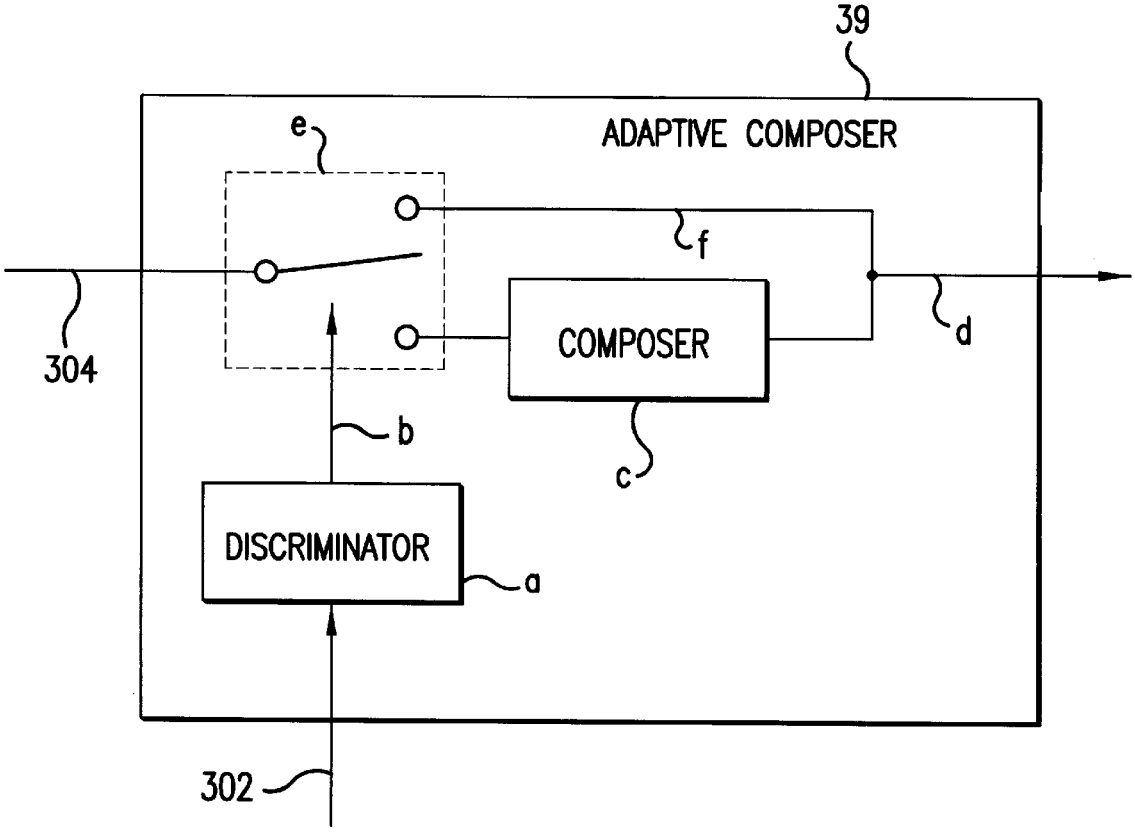
FIG. 6B is a more detailed block diagram of the adaptive composer 39 of FIG. 6A.
Figure 6C:
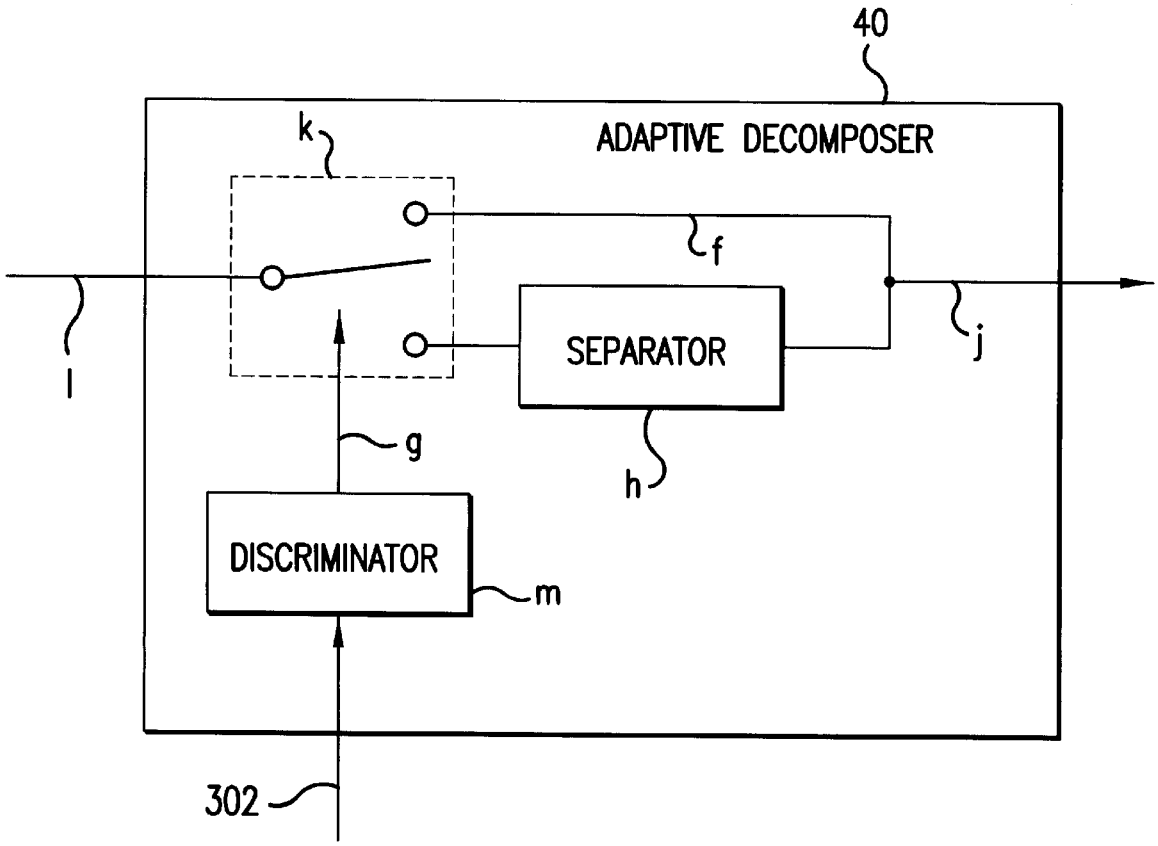
FIG. 6C is a more detailed block diagram of the adaptive decomposer 40 of FIG. 6A.
Figure 7A:
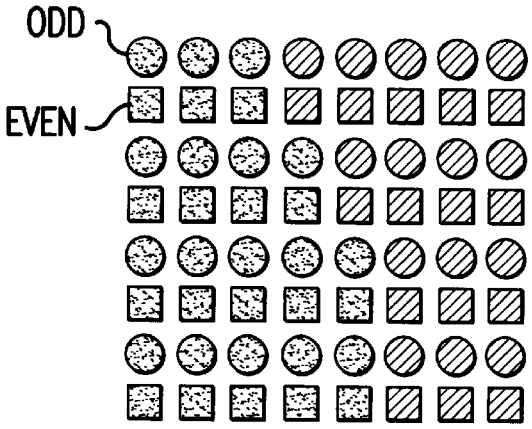
FIGS. 7A–7C show a field composition method using the apparatus shown in FIG. 6A.
Figure 7B:
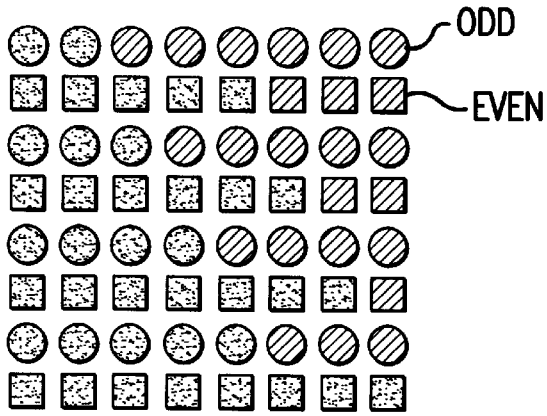
Figure 7C:
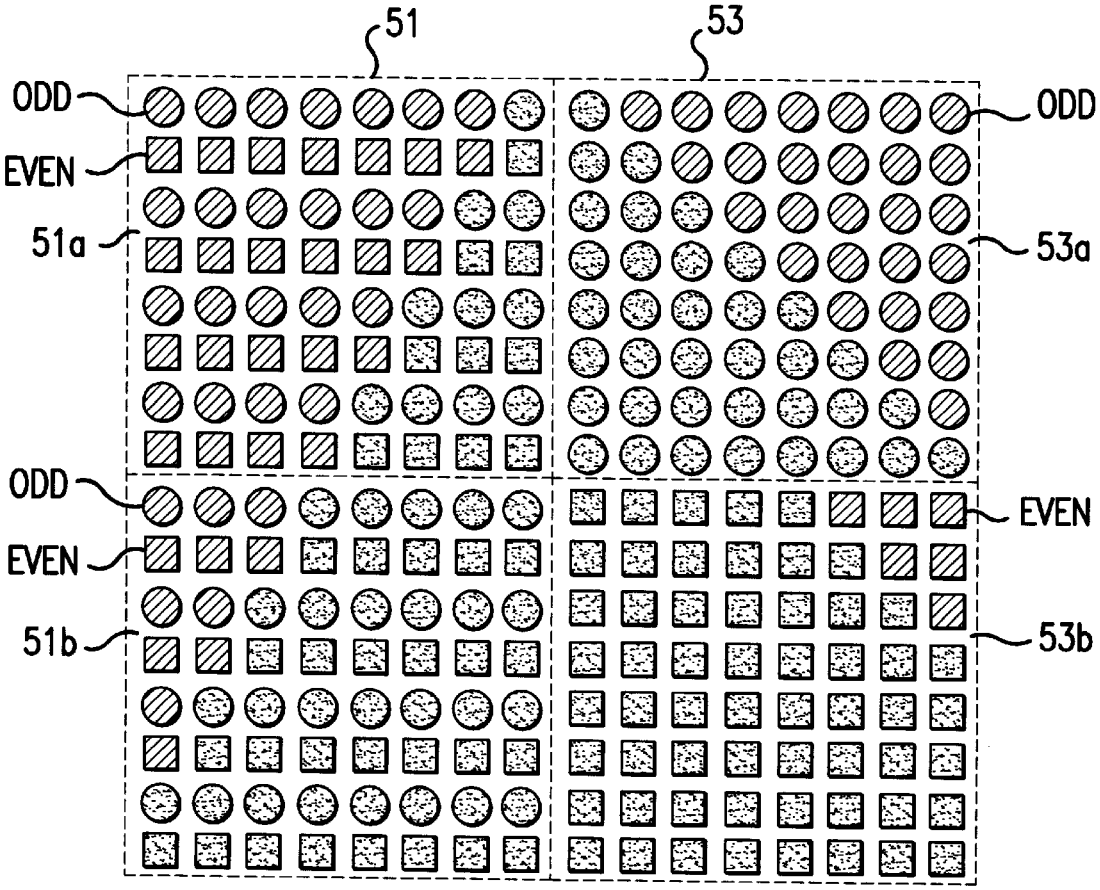

The adaptive composer 39 composes the field independent prediction error signal 304 into blocks on the basis of the motion vector 302, as shown in FIGS. 7A–7C. In FIGS. 7A–7C, "○" indicates a pixel of the odd field, and "□" indicates a pixel of the even field. Further, the shading indicates a difference in illuminance. FIG. 7A shows a block of the prediction error signal 304 in which field composition has been properly carried out, that is, by alternately arranging the pixels of the odd field and the pixels of the even field on every line. Thus, the field composition frame becomes a continuous image. By a continuous image, it is meant that the boundary between the illuminated pixels (grey pixels) and the dark pixels (black pixels) is continuous. If the continuous image is obtained by field composing the power concentration of the low frequency component is effectively raised, especially when orthogonal transformation coding is used by the coder 4 (FIG. 6). As a result, the coding efficiency is increased. FIG. 7B, in contrast, shows a block of the prediction error signal 304 in which field composition has been performed but should not have. An instance where such a prediction error signal would result is when there is a great amount of motion in the image. In particular, the object moves between scanning of the odd field and scanning of the even field. As a result, the field composition frame becomes an image having many discontinuous parts (i.e., it does not have a continuous boundary between grey and black pixels in FIG. 7B). The coded signal has a larger number of high frequency components, and the coding efficiency is decreased.

Hence, depending on the motion within the input image signal, a determination is made whether to use field composition or not.

FIG. 7C shows an example where the above-described adaptive method has been properly applied. In FIG. 7C, the field composition is performed for the region 51, and no field composition is performed for the region 53. Sub-regions 51a and 51b include both even and odd field pixels. In contrast, sub-region 53a includes only odd field pixels, and sub-region 53b includes only even field pixels.

FIG. 6B provides a more detailed description of the adaptive composer 39. This adaptive composer includes a switch "e", a composer "c" and a discriminator "a". These components work together to control blocking in response to the motion vector 302. For example, when the motion vector is zero or ±1 in the even and odd fields, discriminator "a" permits frame composition. Otherwise, the discriminator does not permit frame composition and sends a signal "b" to the switch. The switch "e" is operated in response to signal "b". Upon receiving the signal "b", the switch "e" moves its contact to touch the leg "f", which bypasses the composer "c". When a signal "b" is not received by the switch "e", the switch is positioned to contact the leg leading to the composer "c".

To perform the frame composition, the composer "e" provides a signal "d" by combining the motion compensation prediction signals 304 of the even and odd fields as shown in FIG. 4C. Without frame composition, the motion compensation prediction signals are separately output for the even and odd fields.

Figure 8A:
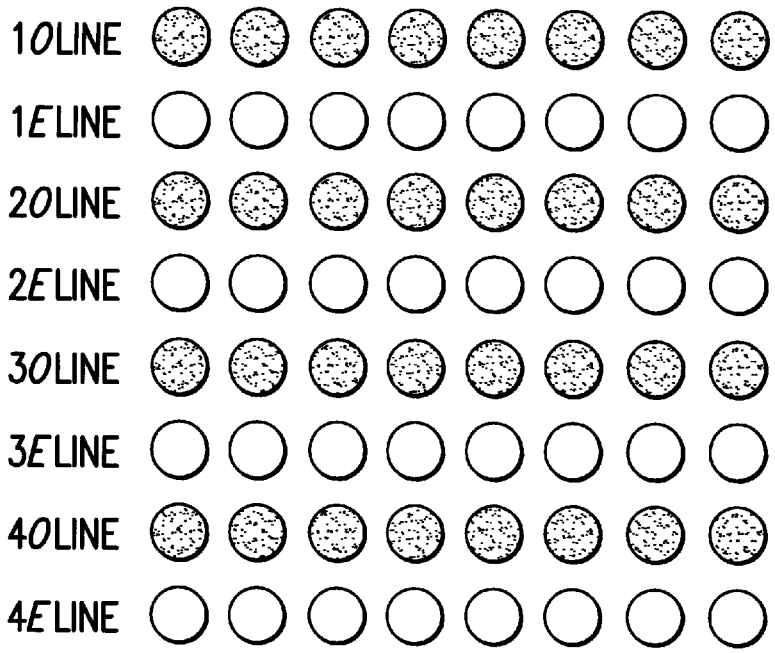
FIGS. 8A and 8B show field composition modes in the apparatus shown in FIG. 6A.
Figure 8B:
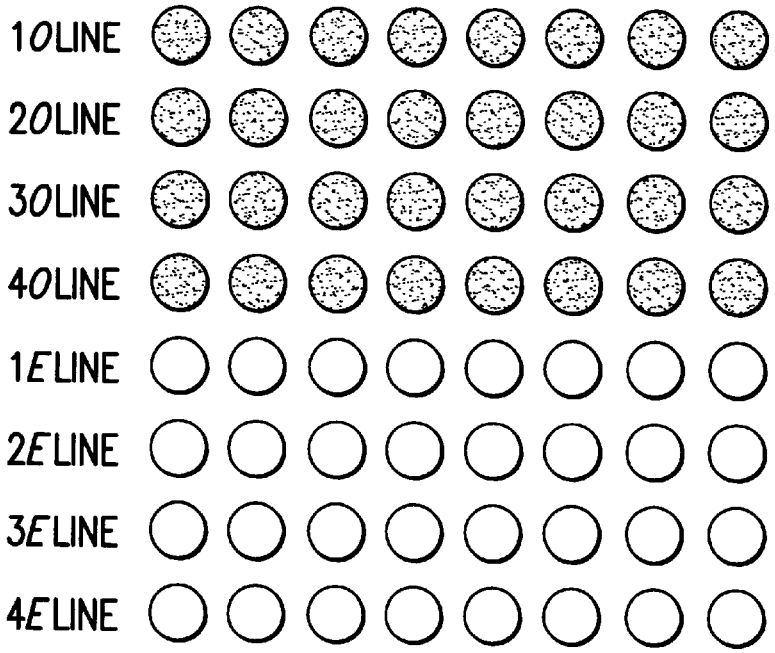

The adaptive composer 39 processes the signal 304 into blocks based on the motion vectors 302. When the motion amounts of the odd and even fields are almost equal, the correlation between the fields is high. Therefore, as shown in FIG. 8A, the signals (10–40) of the odd field (shown as darkened circles) and the signals (1E–4E) of the even field are alternately arranged on successive lines. However, when the motion amounts in the odd fields and in the even fields-differ, the correlation between the even fields and the odd fields is low. Thus, as shown in FIG. 8B, no field composing is employed. As a result, the odd field signals are arranged in the upper part of the block, and the even field signals are arranged in the lower part of the block.

In accordance with the above-described adaptive method, the adaptive composer 39 outputs a blocking-controlled prediction error signal to the coder 35. The coder 35 performs DCT or the like on the blocking-controlled prediction error signal so as to quantize the signal. Prediction error coded data are output to the decoder 36 and the MUX 38.

In the MUX 38, the prediction error coded data are multiplexed with the motion vector 302 sent from the motion detector 32, and the multiplexed data are sent out to the transmission line.

In the decoder 36, the prediction error coded data are decoded to obtain a decoded prediction error signal. The decoded prediction error signal is sent to the adaptive decomposer 40. In the adaptive decomposer 40, all blocks have the same blocking structure. That is, the decoder 36 determines on the block-by-block basis what blocking method was employed to create the block by examining the motion vector, and based on that determination, the decoded prediction error signal is made into a predetermined format by the adaptive decomposer 40.

FIG. 6C provides a more detailed depiction of the adaptive decomposer 40. The adaptive decomposer includes a discriminator "m", a switch "m" and a separator "h". The adaptive decomposer 40 functions inversely relative to the adaptive composer 39 (FIG. 6A). In particular, the adaptive decomposer 40 separates the fields of an input block which frames are composed by the adaptive composer 39. A discriminator "m" functions in a fashion analogous to the previously described discriminator "a" (shown in FIG. 6B). When the motion vector 302 is zero in the odd and even fields, the discriminator "m" permits field separation. Otherwise, the discriminator "m" provides a signal "g" that activates switch "m". When the switch is activated by the signal "g", a connection is made to the separator "h". The separator "h" outputs the signal "i" by separating the frame combine restoration prediction error signal "l" for the odd and even fields as shown in FIGS. 4A and 4B. If the discriminator does not generate the signal "g", the fields are not separated and the restoration prediction error signal "l" is output. In this instance, the signal "l" has already been separated for the even and odd fields.

In the adder 37, the blocking-controlled prediction error signal output from the adaptive decomposer 40 is added with the field composition motion compensation prediction signal 303 to obtain a decoded signal. The decoded signal is sent to the frame memory 33 and stored therein. In this illustrative embodiment, the information concerning how the blocking structure is determined is made to correspond with the motion vector information, and hence the switching of blocking approaches may be performed without requiring any supplementary information.

In this embodiment, the motion vectors, which are independently obtained for the odd and even fields, are used for the adaptive blocking approach so that the motion between the odd and even fields is more exactly controlled.

In this embodiment, although the block size of 4 pixels×4 lines is used in the coder 35, other block sizes such as 8 pixels by 8 lines or the like may be used.

Figure 9:
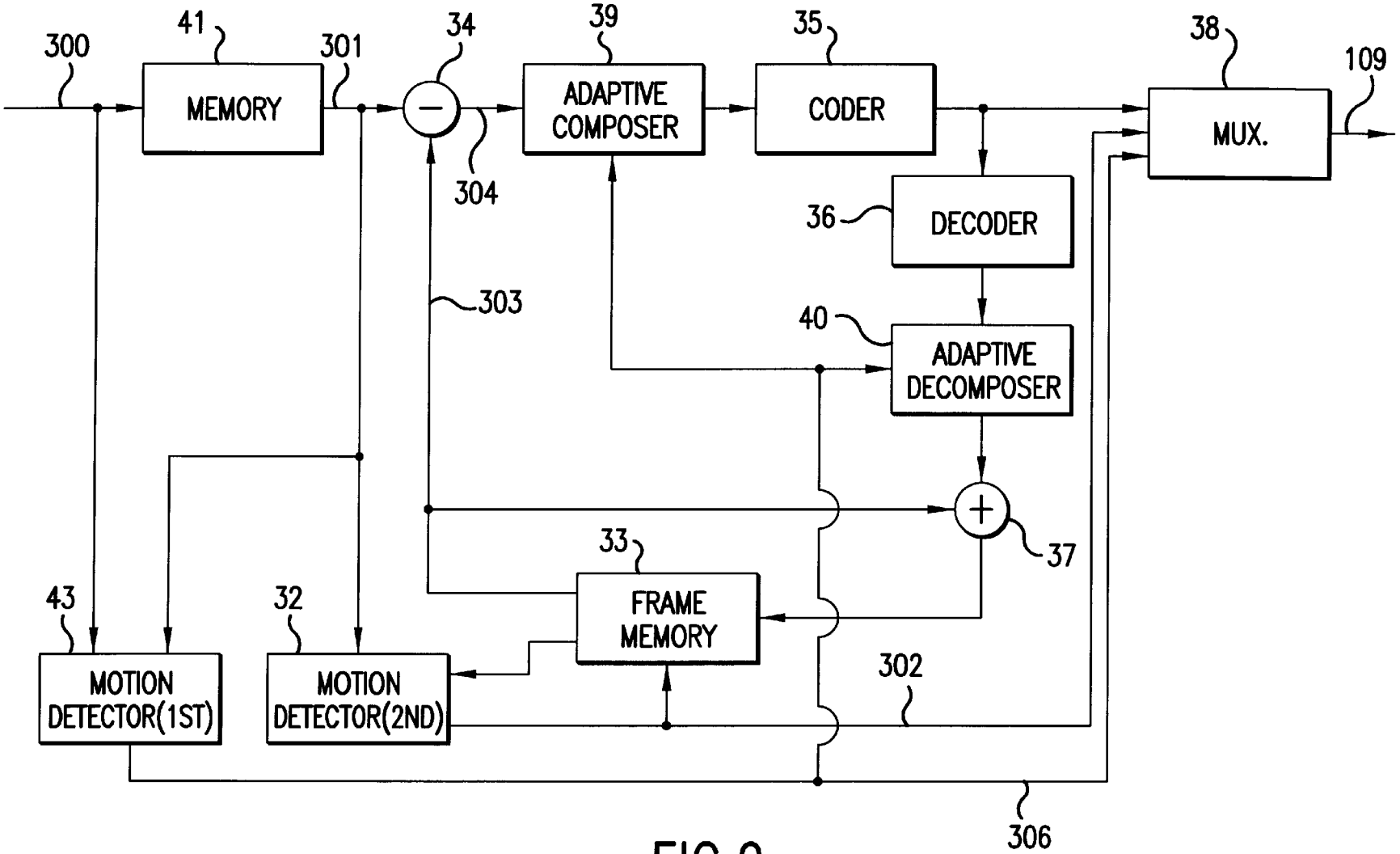
FIG. 9 is a block diagram of a third embodiment of a motion compensation predicting coding apparatus according to the present invention.

FIG. 9 shows a third embodiment of a motion compensation predicting coding apparatus in accordance with the present invention. This third embodiment has several components like the previously described second embodiment. These like components are given like reference numbers. The third embodiment differs from the second embodiment in that this third embodiment includes two types of motion detectors 32 and 43. The operation of these motion detectors 32 and 43 is described below.

The third embodiment operates as follows. An input image signal 300, which is organized into blocks of even field pixels and blocks of odd field pixels, is fed to the first motion detector 43 and the memory 41. The input image signal 300 is stored in the memory 41. The input image signal 300 is also sent to the first motion detector 43. The previously received image signal 301 is read out of the memory 41 and sent to the first and second motion detectors 32 and 43. The image signal 301 is also sent to the subtracter 34. The first motion detector 43 calculates a motion vector 306 between the odd and even fields of the input image signal 300 and the image signal 301 in the same manner as described above for the previous embodiments. The motion vector 306 is then sent to the MUX 38, the adaptive composer 39, and the adaptive decomposer 40. The second motion detector 32 calculates a motion vector 302 indicating the motion between the odd field of image signal 301 and an odd field of a neighboring block read out of frame memory 33 and indicating the motion between the even field of image signal 301 and an even field of a neighboring block read out of frame memory 33. Although the first and second motion detectors are independently provided in this embodiment, one motion detector can be used at a time, being shared for the two purposes.

In this embodiment, motion vector 306 determines whether the coding is carried out in a field composition mode (i.e., the fields are composed) or in a field independent mode (i.e., the fields remain separate). For example, when the motion vector 306 between the even and odd fields is zero, field composition mode is chosen, and the fields are composed. On the other hand, if there is a substantial disparity between motion of the even fields and motion of the odd fields, field independent mode is chosen. The selection of the modes is realized by passing the motion vector 306 to the adaptive composer 306.

The subtracter 34 subtracts the motion compensation prediction signal 303, which is rad out of the frame memory 33, from the image signal 301 which is read out of the memory 41 to obtain a prediction error signal 304. The prediction error signal 304 is fed to the adaptive composer 39. The adaptive composer 39 controls the blocking of the prediction error signal 304 on the basis of the motion vector 306 in the same manner as described for the second embodiment. The other illustrated components are operated in the same manner as the second embodiment described above.

Although the motion vectors that are independently obtained for the odd and even fields are used for the blocking switching in the second embodiment, in the third embodiment the motion vector obtained between the odd and even fields is used to control the adaptive blocking. In this embodiment, the motion vectors between he odd fields and between the even fields in the first motion detector 43 are compared with each other. Hence, the motion between the two fields is exactly known, and suitable blocking control is performed.

Figure 10:
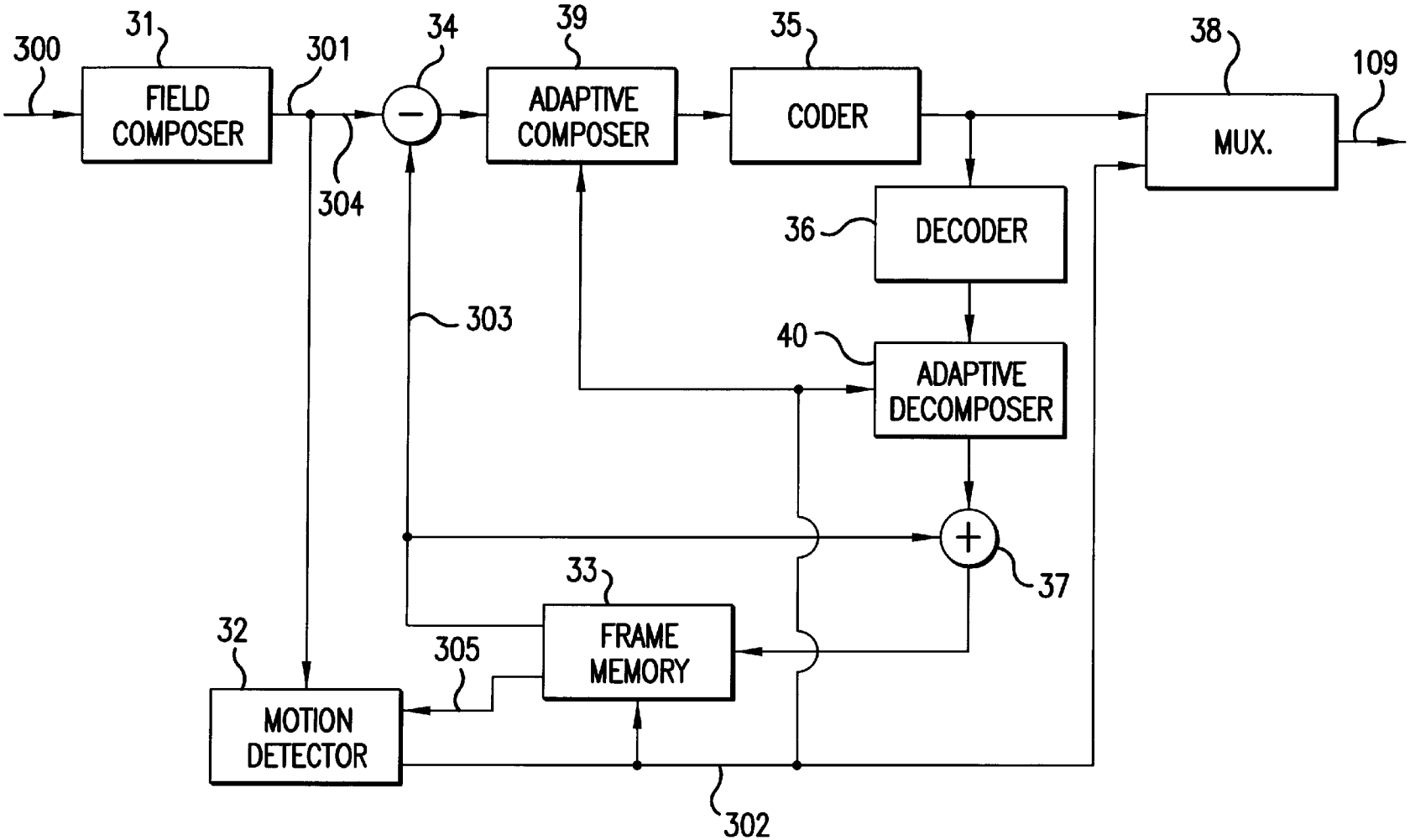
FIG. 10 is a block diagram of a fourth embodiment of a motion compensation predicting coding apparatus according to the present invention

FIG. 10 shows a fourth embodiment of a motion compensation predicting coding apparatus according to the present invention. In this embodiment, the motion compensation predicting coding apparatus comprises a field composer 31, a motion detector 32, a frame memory 33, a subtracter 34, a coder 35, a decoder 36, an adder 37, a MUX 38, an adaptive composer 39 and an adaptive decomposer 40.

The fourth embodiment operates as follows. In this embodiment, motion compensation is carried out from a frame input signal in which two fields are being composed (i.e., the frame input signal is compared with the frame image data stored in frame memory 33). Specifically, an input image signal 300 that has been obtained by an interlaced scanning is composed into one frame in the field composer 31. The field composing performed by field composer 31 is realized in the manner shown in FIGS. 4A–4C. That is, when the input image signals of the odd and even fields are as shown in FIGS. 4A and 4B, respectively, the lines of these two fields are alternately combined to obtain a field composition frame input signal 301 as shown in FIG. 4C. The obtained field composition frame input signal 301 is sent to the motion detector 32 and the subtracter 34°

In the above discussion, the coder is described as performing the coding by DCT, which is kind of orthogonal transformation. It is, however, also possible to perform the coding by utilizing other well-known techniques such as differential pulse code modulation (DPCM) or, vector quantization. When vector quantization is used, two types of codebooks are used (i.e., one codebook for the field blocking and the other codebook for frame blocking) so that the desired codebook will be selected according to either the field or frame blocking done by the blocking controller to further improve coding efficiency.

Figure 3:
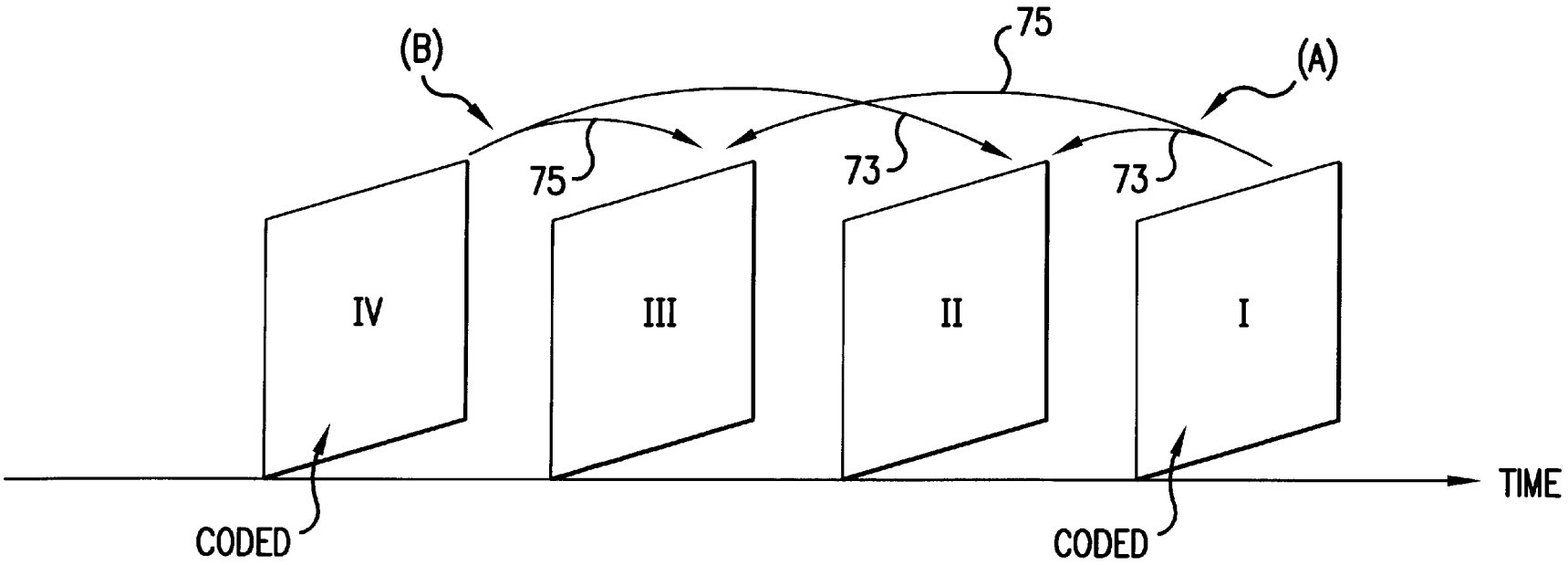
FIG. 3 is a block diagram of a construction of a receiving side used in the embodiments of the apparatus according to the present invention.

In above embodiments, the methods of determining the motion vectors and selecting a motion compensation predicting signal may vary. In particular, the methods may vary as to which frames of pixel data are compared with the current frame of the pixel data. FIG. 3 provides an illustration of one approach to motion compensation prediction. The frames of pixel data are labeled I, II, III and IV and correspond to temporally continuous fields wherein frame IV is the oldest frame. FIG. 3 assumes that frame I and frame IV have already been coded. In accordance with the method illustrated in FIG. 3, the motion detection for frame II is performed by comparing the pixel data in frame II with the pixel data in frame I and comparing the pixel data in frame II with the pixel data in frame IV. These comparisons are indicated in FIG. 3 by arrows 73. The results of the comparison with the lower power for both the even and odd fields is selected. Hence, if the results of the comparison with frame I has lower power than the results of the comparison with frame IV, the results of frame I are selected. Likewise, a similar set of comparisons with frames I and IV are performed with frame III (see arrow 75 in FIG. 3). The lower power results are selected.

Figure 11:
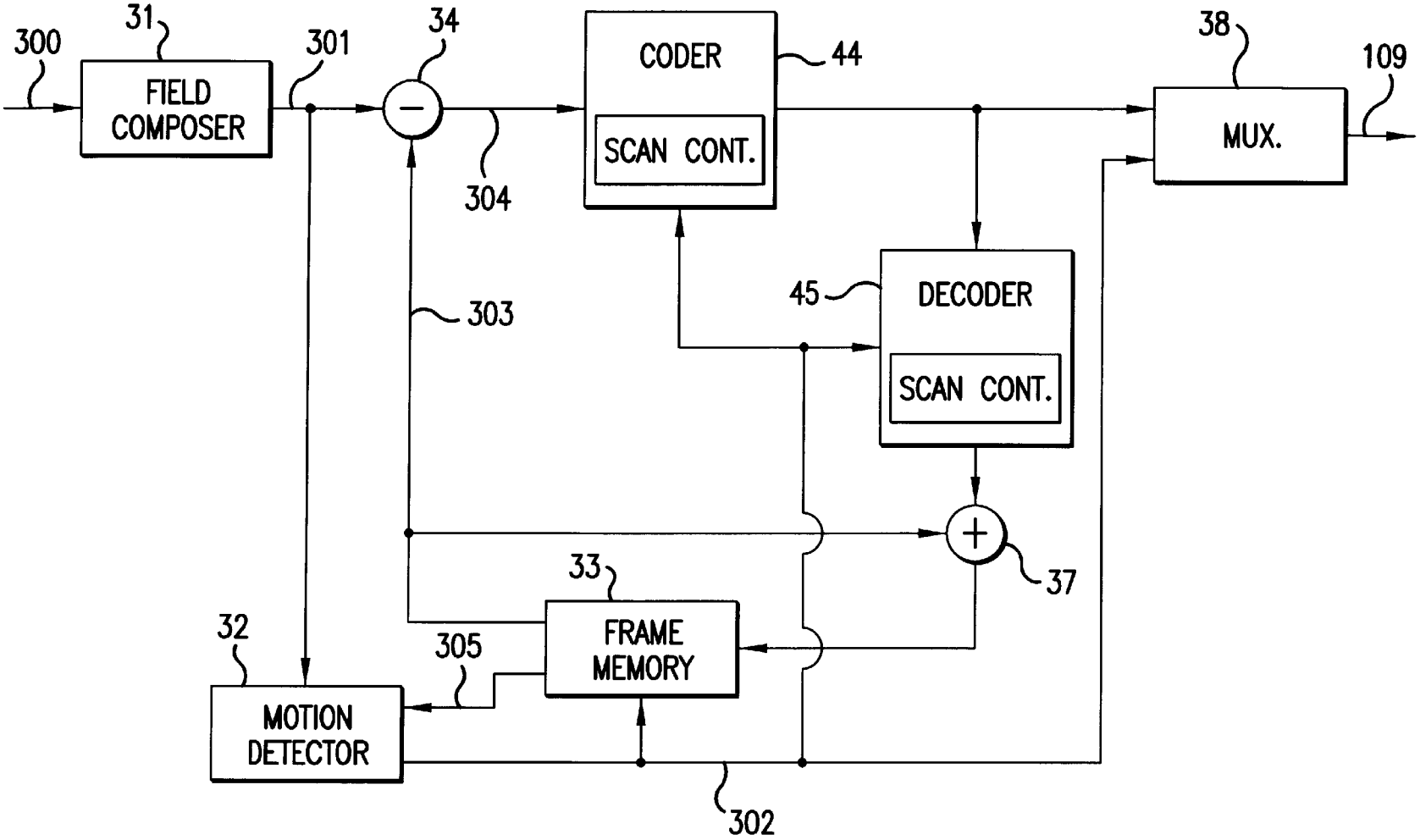
FIG. 11 is a block diagram of a fifth embodiment of a motion compensation predicting coding apparatus according to the present invention

FIG. 11 shows a fifth embodiment of a motion compensation predicting coding apparatus, having a similar construction to the fourth embodiment shown in FIG. 10. This fifth embodiment differs from the fourth embodiment in that it employs an orthogonal transformation coder 44 that is capable of controlling a scanning order of conversion factors rather than employing the coder 35 (FIG. 10) and the adaptive composer 39 of the fourth embodiment. In addition, this fifth embodiment, employs an orthogonal transformation decoder 45 (FIG. 11) that is capable of controlling a scanning order of conversion factors for carrying out an inverse processing of the orthogonal transformation coder 44. This decoder 45 is used in place of the decoder 36 (FIG. 10) and the adaptive decomposer 40 of the fourth embodiment.

The fifth embodiment operates as follows. A motion vector 302 obtained in the motion detector 32 in the same manner as described above. This motion vector 302 is fed to the orthogonal transformation coder 44 and to the orthogonal transformation decoder 45. A prediction error signal 304 is obtained in the subtracter 34 in the same manner as described above. The prediction error signal 304 is also fed to the orthogonal transformation coder 44. The orthogonal transformation coder 44 performs orthogonal transformation coding. The conversion factor is scanned within the block to perform quantization, and the scanning order is controlled by using the motion vector. This processing will now be explained with reference to FIGS. 12A to 12C.

Figure 12A:
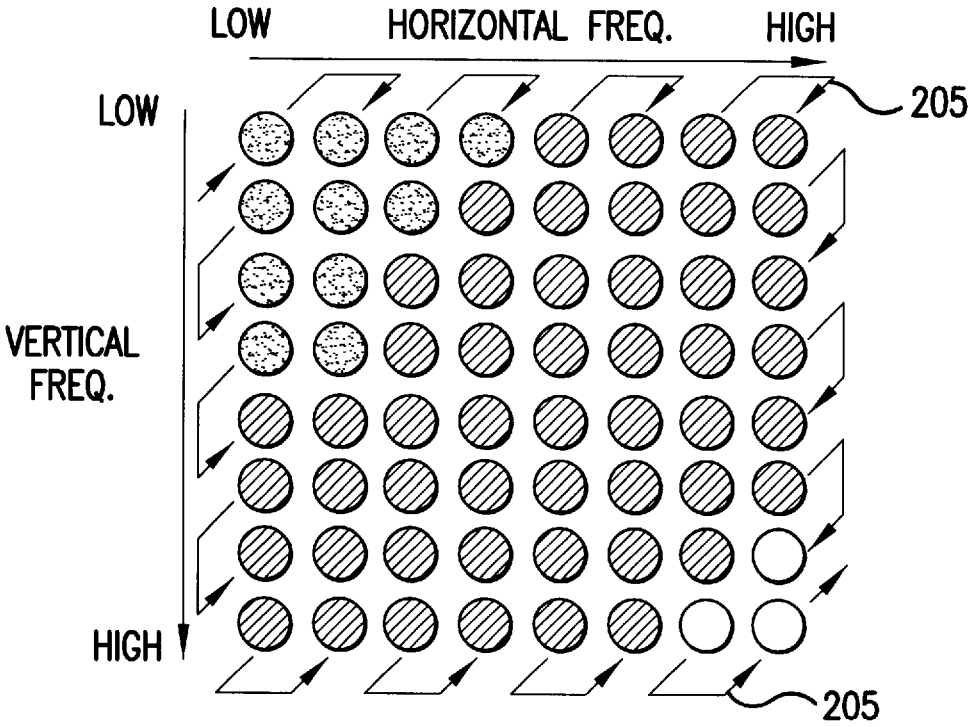
FIGS. 12A–12C are explanatory views of conversion factor distribution in the apparatus shown in FIG. 11.

FIG. 12A shows a power distribution of coefficients in a coefficient matrix obtained by an orthogonal transformation, such as a DCT. The darkness of the pixel in FIG. 12A indicates the power level of the pixel. A dark pixel indicates a high power level and a light pixel indicates a low power level. For the distribution shown in FIG. 12A, it is apparent that the lower frequency components have much greater power than the higher frequency components. The arrows 205 indicate the normal scanning order of the coefficients.

Figure 12B:
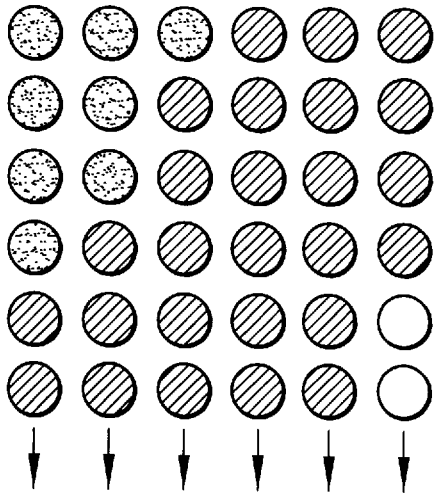
Figure 12C:
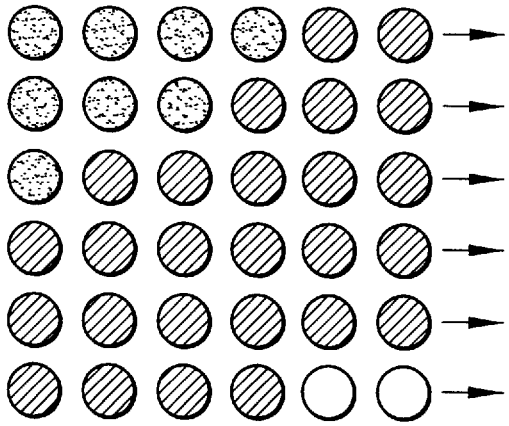

As shown in FIG. 12B, in coefficients obtained by orthogonal transformation of signals which have many transverse components frequency components in the vertical direction are large. In contrast, in an image having many longitudinal components, the frequency components in the horizontal direction are large as shown in FIG. 12C.

When it is determined by the motion vector that the horizontal components are large, the high frequency components are large, even in the error signal. Hence, as shown in FIG. 12C, the coding is carried out in order by scanning in the horizontal direction (as indicated by the arrows). On the other hand, when it is determined that the vertical components are large as shown in FIG. 12B, the coding is carried out in order in the vertical direction as indicated by the arrows. Further, when the components are almost equal in both the horizontal and vertical directions, as shown in FIG. 12A, the coding should take place in the diagonal direction indicated by the arrows 205. Depending on the transformation methods, the relationship between the motion and the scanning direction can be opposite. By adjusting the scanning in this fashion, the fifth embodiment encodes the signals more efficiently.

The orthogonal transformation coder 44 outputs coded data to the MUX 38 and the orthogonal transformation decoder 45. In the MUX 38, the coded data are processed in the same manner as described above for previous embodiments. In the orthogonal transformation decoder 45, an orthogonal transformation and decoding of the coded data are carried out to obtain a decoded prediction error signal. The decoding follows the same scanning order that was followed in the coding. The obtained decoded prediction error signal is fed to the adder 37. The other parts are processed in the same manner as described above.

Preferably, this embodiment is practiced in combination with the previously described embodiments. That is, since the distance between the lines is different in the field composed block and the independent (not field composed) block, the power distribution in the vertical direction is different. Hence, the scanning control based on the difference of the power distribution may be performed, and as a result, effective quantization processing may be carried out. In this embodiment, since the motion vector includes the control information, no supplementary information is required.

Figure 13:
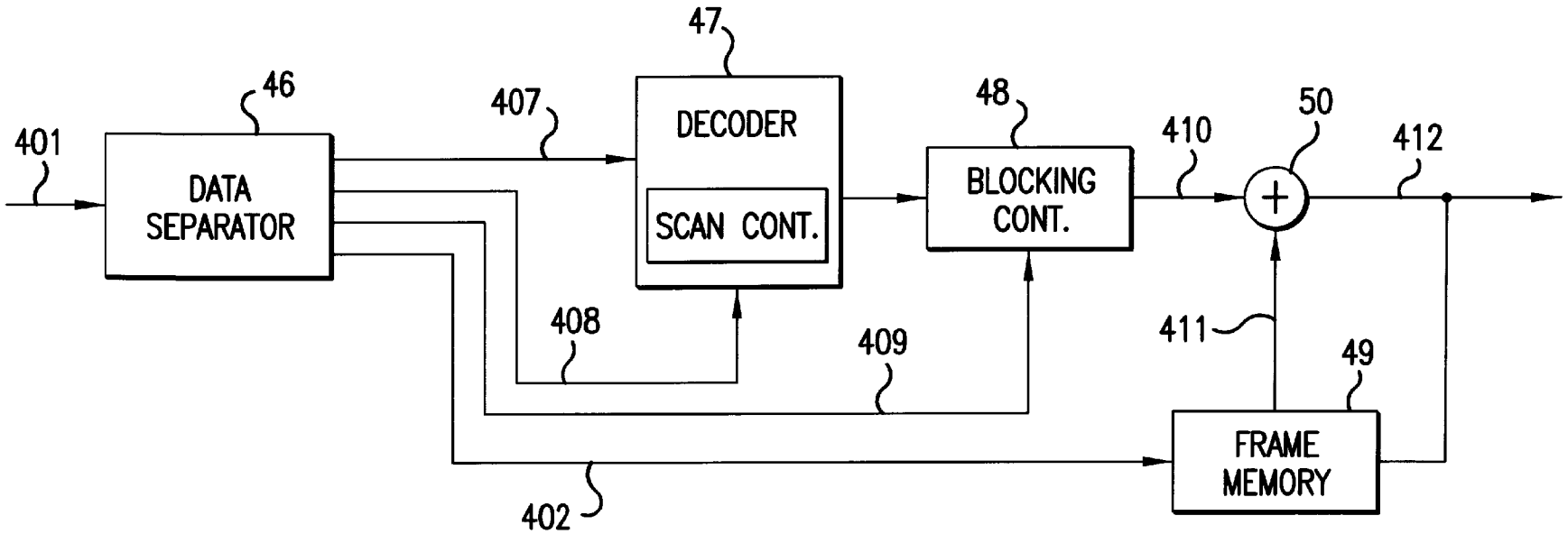
FIG. 13 is a block diagram of a construction of a receiving side used in the embodiments of the apparatus according to the present invention.

FIG. 13 shows an embodiment of a receiving side for the above-described embodiments of the motion compensation predicting coding apparatus. The receiving side includes a data separator 46 for separating the multiplexed coded data that is output from the transmitter side, an orthogonal transformation decoder 47, a blocking controller 48, a frame memory 49 and an adder 50. The latter four components perform the inverse operation to the corresponding components in the transmitter side which have been described above.

The receiving side shown in FIG. 13 operates as follows. Coded data 401 that has been output from the MUX 38 of the motion compensation predicting coding apparatus are input to the data separator 46. The data separator 46 separates the coded data 401 and outputs first data 407 or factor data that concerns an orthogonal transformation, a motion vector 402, that is sent to the frame memory 49, second data 408 that represents a factor scanning order and third data 409 that exhibits a block structure of a prediction error signal. The decoder 47 receives the first and second data 407 and 408 and carries out an inverse orthogonal transformation for every block unit to decode the prediction error signal. At this time, the decoder 47 determines the scanning order of the transformation factors within the block on the basis of the second data 408. The blocking controller 48 receives the third data 409 from the data separator 46 and a decoded prediction error signal from the decoder 47. The blocking controller 48 determines whether the decoded prediction error signal is a field composed block or a field independent block on the basis of the third data 409. The block structure is unified by the blocking controller 48 to output a blocking-controller controlled prediction error signal 410 to the adder 50. The adder 50 adds a motion compensation prediction signal 411, that has been read out of the frame memory 49 at an address specified by the motion vector 402, to the blocking-controlled prediction error signal 410 and obtains a decoded signal 412. The decoded signal 412 is sent to the frame memory 49 and is stored therein.

In this embodiment, both the second data 408 representing the factor scanning order and the third data 409 representing the block structure of the prediction error signal may be replaced with the motion vector 402.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

We claim:

1. A motion compensation predicting coding apparatus for receiving odd and even fields of an input image signal, forming pixel data for each odd and even field into a block to obtain a current block image pattern, comparing the current block image pattern with a previous block image pattern to obtain a motion vector for the block, an obtaining a motion compliance prediction signal based upon the motion vector, said apparatus comprising:

a) a motion vector detector for generating a motion vector indicative of a displacement difference of the current block image pattern in one of two odd fields, two even fields, and an odd field and an even field, relative to the previous block image pattern;

b) a motion compensation prediction signal generator for generating the motion compensation prediction signal for each block of a field to be encoded; based upon said motion vector;

c) means for generating a prediction error signal for each block of a field to be encoded by subtracting said motion compensation prediction signal from the input image signal of said field to be encoded;

d) a coder for coding the prediction error signal, said coder including i) a transformation means for performing an orthogonal transformation on the prediction error signal to produce a coefficient matrix that includes a plurality of coefficients in a single horizontal-vertical plane of the coefficient matrix;

ii) a scanning controller for determining a scanning order based on the motion vector, and for scanning said plurality of coefficients in the single horizontal-vertical plane of said coefficient matrix in accordance with the scanning order to read out said plurality of coefficients; and iii) a quantizer for quantizing said plurality of coefficients rad out from said coefficient matrix; and e) adaptive blocking means, coupled to the motion vector detector, for providing a composed error signal, said adaptive blocking means receiving the motion vector and responsively arranging therewith the composed error signal according to one of a field independent mode and a field composition mode to produce the composed error signal in which in the field composition mode, the composed error signal is arranged into alternating lines of data corresponding to the odd and even fields of the input image, and in which the in field independent mode, the composed error signal is arranged into a group having data corresponding to one field of the input image followed by a group having data corresponding to other field.

2. The motion compensation predicting coding apparatus of claim 1, further comprising:

a frame memory, coupled to the motion vector detector and to the means for generating a prediction error signal, for storing data corresponding to the previous block image pattern, wherein the frame memory includes producing means for producing a motion compensation prediction signal based on the motion vector and for providing the motion compensation prediction signal to the means for generating a prediction error signal.

3. The motion compensation predicting coding apparatus of claim 1, wherein the scanning order is determined to be one of a plurality of scanning orders, the plurality of scanning orders including:

a first order of scanning the plurality of coefficients in a horizontal direction of the coefficient matrix;

a second order of scanning the plurality of coefficients in a vertical direction of the coefficient matrix; and a third order of scanning the plurality of coefficients in a diagonal direction of the coefficient matrix.

4. A motion compensation predicting coding apparatus for encoding pixel data of an image signal, wherein said image signal includes pixel data organized into an even field and an odd field for a portion of an image, said apparatus comprising:

a) a motion detector for comparing the pixel data of the image signal with pixel data of a previous image signal of a previous image, the motion detector including means for generating a motion vector indicative of displacement differences between the image signal and the previous image signal of the previous image;

b) a subtracter for generating a prediction compensation error signal by subtracting the pixel data of the previous image signal from the pixel data of the image signal;

c) an adaptive blocking mechanism for receiving the prediction compensation error signal and generating a composed signal, said adaptive blocking mechanism receiving the motion vector and responsively arranging therewith the composed signal according to one of a field independent mode and a field composition mode, in which the field composition mode, the error signal is arranged into alternating lines of data corresponding to the odd and even fields of the input image, and in which in the field independent mode, the error signal is arranged into a group having data corresponding to one field of the input image followed by a group having data corresponding to other field; and d) a coder for receiving and encoding the composed signal from the adaptive blocking mechanism.

*5. A motion compensation predicting decoding apparatus for receiving multiplexed coded data, the apparatus comprising:*

*a separator for separating the multiplexed coded data into a plurality of data blocks including a plurality of transformation factors, and a factor scanning order code defining the scanning order of the transform factors between alternative scanning orders, collectively defining a block prediction error signal, and a block structure code and motion vector associated with the block prediction error signal;*

*a decoder for decoding the prediction error from the plurality of transformation factors based on a scanning order defined by the factor scanning order code;*

*a blocking controller for determining a block type of each decoded block prediction error signal based on the block structure code;*

*a memory for storing an image signal, the image signal being read out therefrom shifted by the motion vector to form a motion compensated prediction signal; and*

*an adder for adding the decoded block-controlled block prediction error signals to the motion compensated prediction signal to produce a decoded image signal.*

*6. A motion compensation predicting decoding apparatus for receiving and decoding multiplexed coded data, the apparatus comprising:*

*a separator for separating the multiplexed coded data into a plurality of coded data blocks and associated encoding information, said encoding information including a factor scanning order defining the scanning order of transform factors within the coded data block between alternative scanning orders, a block structure code identifying whether each block is a field composed or a field independent block and a motion vector associated with the block prediction error within the encoded data blocks;*

*a decoder, responsive to said separator, for decoding each of the plurality of encoded data blocks based on the scanning order defined by the factor scanning order to produce predictively coded image information;*

*a blocking controller, receiving the output of the decoder, for determining a block type of each decoded block of predictively coded image information and assembling the decoded blocks in dependence on whether the blocks are field composed or field independent based on the block structure code;*

*a memory for storing an image signal; and*

*an adder, receiving the output of the blocking controller and the memory, for adding the predictively encoded image information to associated portions of the image signal stored in said memory.*

*7. The apparatus of claim 6 wherein said encoded data blocks are orthagonal transformations.*

*8. A motion compensation predicting decoding apparatus for receiving and decoding multiplexed coded data, comprising:*

*a separator for separating the multiplexed coded data into a plurality of coded data blocks and associated encoding information, said encoding information including a factor scanning order defining the order of transform factors within the coded data block, a block structure code identifying whether each block is a field composed or a field independent block and a motion vector associated with the block prediction error within the encoded data blocks;*

*a decoder, responsive to said separator, for decoding each of the plurality of encoded data blocks based on the scanning order defined by the factor scanning order to produce predictively coded image information;*

*a blocking controller, receiving the output of the decoder, for determining a block type of each decoded block of predictively coded image information and assembling the decoded blocks in dependence on whether the blocks are field composed or field independent based on the block structure code;*

*a memory for storing an image signal; and*

*an adder, receiving the output of the blocking controller and the memory, for adding the predictively encoded image information to associated portions of the image signal stored in said memory;*

*wherein said block structure code is defined by the motion vector.*

*9. The apparatus of claim 8 wherein said factor scanning order is defined by the motion vector.*

* * * * *